United States Patent [19]

Ostwald et al.

[11] Patent Number: 4,769,989
[45] Date of Patent: Sep. 13, 1988

[54] DEVICE FOR CONTROLLING THE PRESSURE IN THE AUXILIARY-PRESSURE SUPPLY SYSTEM OF A BRAKE UNIT

[75] Inventors: Fritz Ostwald, Dreieich; Hans-Christof Klein, Hattersheim; Klaus-Dieter Blum, Kelkheim, all of Fed. Rep. of Germany

[73] Assignee: Alfred Teves GmbH, Frankfurt Am Main, Fed. Rep. of Germany

[21] Appl. No.: 799,957

[22] Filed: Nov. 20, 1985

[30] Foreign Application Priority Data

Nov. 24, 1984 [DE] Fed. Rep. of Germany ....... 3442909

[51] Int. Cl.$^4$ ............................................. F16D 31/02
[52] U.S. Cl. ..................................... 60/394; 60/414; 60/418; 60/582
[58] Field of Search .................. 60/394, 418, 582, 414

[56] References Cited

U.S. PATENT DOCUMENTS

| | | | |
|---|---|---|---|
| 3,350,142 | 10/1967 | Schuman | 60/394 |
| 3,971,215 | 7/1976 | Baron | 60/414 |
| 3,991,570 | 11/1976 | Keller | 60/413 |
| 4,100,739 | 7/1978 | Shaffer | 60/418 |
| 4,369,625 | 1/1983 | Izumi | 60/394 |
| 4,402,554 | 9/1983 | Belart | 303/10 |

FOREIGN PATENT DOCUMENTS

1371616 10/1974 United Kingdom .
1375726 11/1974 United Kingdom .

OTHER PUBLICATIONS

"Industrial Hydraulic Technology". Bulletin 0221-B1. Parker Fluidpower. Jan., 1980. pp. 8-6, 10-5, 10-6.

Primary Examiner—Abraham Hershkovitz
Attorney, Agent, or Firm—James B. Raden; Robert P. Seitter

[57] ABSTRACT

A device for controlling the pressure in an auxiliary-pressure supply system of a hydraulic brake unit for automotive vehicles, which device comprises a diaphragm-type or bladder-type accumulator equipped with a hydraulic and electric switching arrangement by way of which the hydraulic pressure in the pressure accumulator can be reduced to a predetermined value after the engine of the vehicle has been turned off. An electromagnetic multidirectional control valve is used to divert hydraulic fluid back to a reservoir through a pressure-limiting valve connected downstream thereof. After the engine of the vehicle has been turned off, the multidirectional control valve remains open until the accumulator pressure has decreased to at least the gas inflation pressure of the accumulator. The invention reduces permeation of gas molecules through the diaphragm of the accumulator into the hydraulic fluid and thus effects a longer useful life of the pressure accumulator.

6 Claims, 1 Drawing Sheet

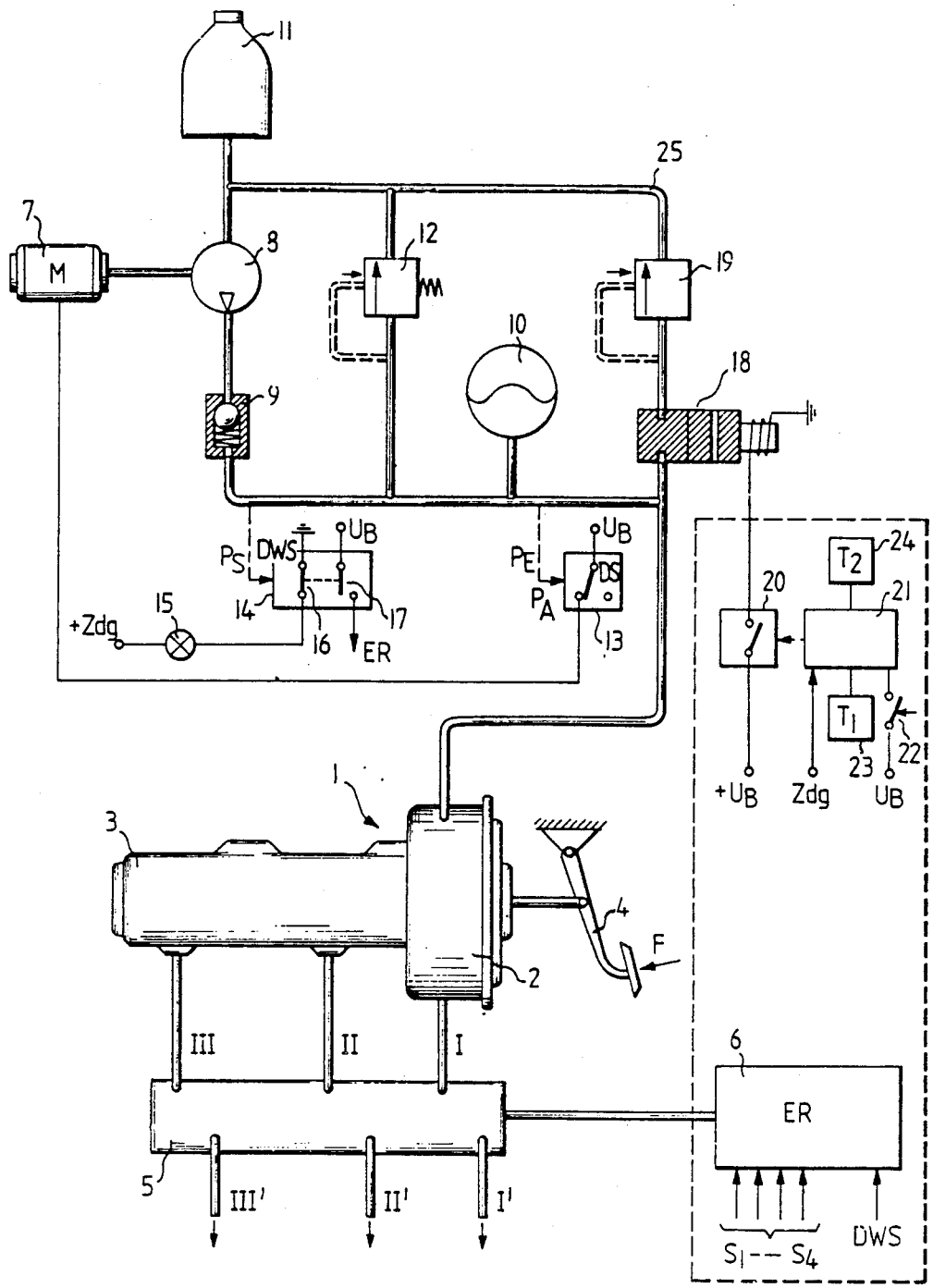

DEVICE FOR CONTROLLING THE PRESSURE IN THE AUXILIARY-PRESSURE SUPPLY SYSTEM OF A BRAKE UNIT

BACKGROUND OF THE INVENTION

The present invention relates to a device for controlling the pressure in the auxiliary-pressure supply system of a vehicle hydraulic brake unit, which device includes a diaphragm-type or bladder-type pressure accumulator, wherein the operating pressure is maintained by a hydraulic pump driven by a motor adapted to be switched on and off in response to pressure.

Brake units comprising a hydraulic pressure accumulator which is loaded by means of an electromotively driven hydraulic pump are known. In these units, attainment of a predetermined maximum operating pressure, a pressure which electrically disconnects and de-activates the electric motor and hydraulic pump until the working pressure has fallen to a minumum threshold value.

Diaphragm-type accumulators or bladder-type accumulators typically are filled with gas, most often nitrogen which is compressed by the hydraulic pressure developed by the pump. The hydraulic medium takes up the volume of gas displaced. A rubber-elastic diaphragm subdivides the interior of the accumulator into two chambers, one of which contains the gas, and the other the hydraulic medium.

Since for various reasons it is impossible to refill gas into these type pressure accumulators of a brake unit, the useful life of such accumulators is to a substantial degree dependent on the preservation of the gas inflation pressure. The permeation of gas through a rubber-elastic diaphragm as typically used in pressure accumulators cannot be prevented entirely and steps aimed at reducing the permeation of gas to a minimum are desirable. Heretofore, it has been proposed to use a special mixture of nitrogen and a gas having a large molecular diameter, such as sulfurhexafluoride as disclosed in the German patent application No. P 33 13 910.5. Compared to a gas of pure nitrogen, which is particularly adapted for use in pressure accumulators, the permeation is reduced considerably due to the added sulfurhexafluoride, and in particular at the high temperatures prevailing in the engine compartment of an automotive vehicle. Certain unfavorable properties of sulfurhexafluoride are of comparatively minor importance in comparison to usefulness of achieving its intended purpose.

Furthermore, it is known from the German printed and published patent application No. 29 10 554 to interpose a third compartment, namely a closed fluid compartment, between the compressible gas filled chamber and the hydraulic chamber. In this arrangement, the gas compartment is isolated from the interposed third compartment by a metal wall designed as a bellows which is practically gas-impermeable, while a rubber-elastic diaphragm which performs the control functions isolates the two fluid chambers. While functionally effective, this structure is not cost effective from a manufacturing standpoint.

SUMMARY OF THE INVENTION

It is the principle object of the present invention, to increase the useful life of a pressure accumulator of the type for use in vehicle brake units and which is exposed to the special conditions prevailing in automotive vehicles by reducing the permeation of molecules of the gas therein through the rubber-elastic diaphragm into the hydraulic fluid.

It has been determined that this object can be achieved in a simple, yet technically advanced manner by a device of the type intitially referred to, the special characteristic of which provides for a hydraulic and electric switching arrangement which permits reduction of the hydraulic pressure in the pressure accumulator to a predetermined value after the engine of the automobile vehicle has been turned off.

The present invention is based on the knowledge that, on the one hand, the permeation of gas molecules into the hydraulic fluid is dependent on the instantaneous pressure in the gas compartment of the pressure accumulator, that is the operating pressure, and that, on the other hand, the periods during which an automotive vehicle is not operating usually are very long compared to its working time. Frequently, the ratio of the period of nonuse to working time is considerably greater than 10:1. Also of significance for the purpose of achieving the effects by the present inventive arrangement is the fact that the operating pressure of the hydraulic accumulator in an automotive vehicle normally amounts to about twice the gas inflation pressure. Also, there is normally available a short period of time after putting a vehicle into operation during which the hydraulic pump is able to develop a sufficient level of pressure in the accumulator.

It can be appreciated therefore that the reduction of the accumulator pressure during the period the vehicle is not in use as provided by the present invention substantially reduces gas pressure in the pressure accumulator thereby minimizing otherwise favorable conditions for the permeation of gas molecules through the diaphragm into the hydraulic fluid. This has as a result considerable prolongation of the useful life of the pressure accumulator. The deterioration of a pressure accumulator is mainly dependent on time and, in the absence of the inventive arrangements disclosed herein, is especially critical in rarely driven vehicles which are serviced in relatively long intervals and reach a long service life.

That is to say, the present invention enables in an easy way and by entailing little expenditure in components to overcome a significant shortcoming of present hydraulic vehicle brake units.

According to a preferred embodiment of the invention, a switching arrangement is provided comprising an electromagnetically actuatable, multidirectional control valve, more specifically a two-way/two-position directional control valve, which is closed in its inactive position and which can be switched to open. The valve is inserted in a pressure fluid conduit interconnecting the pressure accumulator with a pressure supply reservoir. By changing over of the valve, the pressure in the accumulator can be reduced to the predetermined value during the period the vehicle is not being operated.

According to another embodiment of this invention, there is provided a pressure-responsive switch which is set to the predetermined value to which the accumulator pressure is to be reduced, which switch determines the duration of change-over of the multidirectional control valve after the vehicle engine is turned off and thereby determines the magnitude of the residual pressure maintained in the pressure accumulator.

According to another important feature, the present invention provides for a preloaded valve or a pressure-limiting valve connected in series with the multidirectional control valve in the pressure fluid conduit interconnecting the pressure accumulator and the pressure supply reservoir, which closes the pressure-fluid conduit at the predetermined value of the reduced pressure.

According to a still further important aspect of the invention, the predetermined value to which the accumulator pressure can be reduced preferably corresponds to the gas inflation pressure of the pressure accumulator, or alternatively to about 10 to 20 percent higher than the gas inflation pressure so that sufficient hydraulic energy will be available for providing braking action at any time, for example, immediately upon starting the engine of the vehicle.

According to another important factor, the inventive device includes a delay circuit which causes the reduction of the accumulator pressure to start a predetermined period of time after the engine of the vehicle has been turned off ranging from several minutes up to about one hour. The delay time can be varied by virtue of a manually actuatable switch. Furthermore, it is possible to vary the delay time and/or the residual pressure to which the pressure accumulator can be reduced after a period of vehicle use depending upon certain specific parameters such as outside temperature.

BRIEF DESCRIPTION OF THE DRAWING

The features, and advantages of the present invention will be understood after reading the following Detailed Description Of The Preferred Embodiment in conjunction with the accompanying drawing in which:

the drawing shows in a schematically simplified view the essential components as well as the hydraulic and a portion of the electric wiring diagram of an inventive device for use with a slip-controlled hydraulic brake unit for automotive vehicles.

DETAILED DESCRIPTION OF THE PREFERRED EMBODIMENT

The braking pressure generator 1 of the brake unit includes a hydraulic brake power booster 2 of a well-known type and which is unitized with a tandem master cylinder 3. On depression of a brake pedal 4 which is connected to the booster 2 in the direction of the pedal force symbolized by the arrow F, a pressure proportional to the pedal force will be built up inside the hydraulic brake power booster 2, which pressure acts on the pistons, not shown, in the master cylinder 3, on the one hand, and which determines directly the braking pressure in a brake circuit I, on the other hand. Two further, hydraulically isolated brake circuits II, III are connected to the tandem master cylinder 3. In the embodiment of a slip-controlled brake system described herein, the three brake circuits I, II, III are connected by way of a valve assembly 5 and hydraulic connecting lines I', II', III' to the wheel brakes, not shown. Whenever a tendency of the brake to lock is sensed at the wheels during a braking action, the valve 5 functions in a well-known manner to keep the braking pressure in the wheel cylinders constant; that is, to decrease and increase the pressure so as to prevent locking of the wheels, and to thereby maintain driving stability and steerability of the vehicle during the braking action even under unfavorble braking conditions.

To control the valves in the valve assembly 5 and thereby control the slip, there is provided an electronic controller 6 which is supplied with electrical signals 51–54 from wheel sensors, not shown, carrying information about the rotational behavior of the individual wheels necessary for slip control.

The auxiliary pressure source of the hydraulic brake system includes a hydraulic pump 8, driven by an electric motor 7 and a check valve 9. Also provided is a hydraulic accumulator 10 as well as a pressure supply reservoir 11 which is connected to the suction side of the hydraulic pump 8. A pressure-relief valve 12 is adapted to open in case the motor fails to turn off due to some abnormality as a consequence of which a pressure would develop in the auxiliary pressure supply system far in excess of the safe or intended operating pressure. In the event of an operating pressure between 140 and 180 bar, for which the system described herein is designed, the pressure-limiting valve 12 responds at a pressure of about 210 bar.

Instead of the electric motor 7, the vehicle engine could be utilized for driving the hydraulic pump 8, through, for example, an electromagnetically controllable clutch.

To control the pressure in the hydraulic pressure supply system, there is provided a pressure switch (DS) 13 which closes and provides an electrical connection between the pump's driving motor 7 and a battery unit $U_B$ when the pressure in the system falls below the switch-on pressure $p_E$ of about 140 bar. When the switch-off pressure $p_A$—herein about 180 bar—is reached, the pressure switch 13 will open and disconnect pump motor 7 from the battery.

Furthermore, the brake unit illustrated includes a pressure alarm switch (DWS) 14 which, by way of a contact 16, causes an alarm lamp 15 to light up as soon as, with the ignition started, the pressure drops below a predetermined minimum threshold value $p_S$ of about 105 bar. A second contact 17 of the pressure alarm switch 14, which is also closed during proper operation of the unit, establishes a connection between the battery unit and the electronic controller (ER) 6. By way of this contact 17 of the pressure alarm switch 14, a partial de-activation of the slip control will be initiated in the system shown herein when the pressure falls below the threshold value $p_S$. After this partial de-activation, only the rear wheels are still subject to slip control, while the front wheels may lock in the presence of a too high braking pressure.

Pressure reduction after the vehicle's engine has been turned off is accomplished with a two-way/two-position directional control valve 18 which is inserted into a pressure fluid conduit 25. The valve 18 is an electromagnetically actuatable, multidirectional control valve which is normally closed in its inactivated position and which is adapted to be switched over and open by way of an electric signal. A pressure-limiting valve 19 is connected downstream of the valve 18 and is set to the gas inflation pressure of the bladder-type or diaphragm-type accumulator 10 or to a somewhat higher pressure value if desired.

To reduce the accumulator pressure to the predetermined value, as defined by the adjustment of the pressure-limiting valve 19, the solenoid valve 18 is actuated to assume its open position after the vehicle engine has been turned off or alternatively after a specific delay time—by the closing of a switch 20 which completes a connection to the voltage source $U_B$. The switch 20, in turn, is actuated by an output signal of a circuit 21 which, if need be, determines the duration of the time delay depending on several conditions and/or switch positions.

In the embodiment of the invention described herein, the switch 20 is kept open in any case after the ignition of the engine has been actuated through the inlet 'Zdg', thereof assuring that the pressure fluid conduit 25 is kept closed by means of the solenoid valve 18 after the vehicle has been put into operation. Furthermore, a manually actuatable switch 22 is included in one of the signal lines leading to the circuit 21, which switch provides for temporarily preventing the pressure reduction after the vehicle engine is turned off when desired such as, for example, when only frequent short interruptions in vehicle operation are contemplated. It is expedient in some cases to combine a like break switch 22 with a logic element 23 which automatically brings about re-setting of the hand-actuated switch 22 after a predetermined period of time $T_1$, e.g. after 12 hours. Allocated further to the circuit 21 is another time function element 24 which, if it is deemed suitable or is desired, sets a predefined or a variable period of time $T_2$ which is desired to occur between the turning off of the vehicle engine and the beginning of the pressure reduction by energization of the valve 18.

The electronic control unit 6 and the circuit 21, including the time function elements 23 and 24 and the switch 20, may be included in a common circuit. The functions of these electronic components may likewise be realized by a programmed circuit, for example, by a microcontroller.

That is to say, the inventive device enables the pressure in the energy supply system or in the pressure accumulator 10 to be reduced to a predetermined residual value after the vehicle engine has been turned off either immediately or after a predefined delay $T_1$. While in a slip-controlled hydraulic brake unit of the type shown the operating pressure ranges from about 140 to about 180 bar, the pressure is decreased by way of the valve 18 and the pressure-limiting valve 19 to attain a gas inflation pressure in the accumulator of about 10 to about 84 bar pressure, after the engine has been turned off. The permeation of gas molecules through the diaphragm of the accumulator into the hydraulic fluid, which permeation is dependent to a large degree on the gas pressure in the accumulator, is thereby considerably reduced during the period of nonuse of the vehicle.

When the ignition is actuated and the engine started, the pressure switch 13 causes the pump motor 7 and thereby the pump 8 to operate so that the pressure threshold $p_S$ of e.g. 105 bar is exceeded. After a short time the signal lamp 15 is extinguished. This provides for a check for proper functioning of the energy supply, the pressure switch 13, the pressure alarm switch 14 and the signal lamp 15. No appreciable delay in operation ensues therefrom, because, for safety reasons, the operability of installations of these type brake units is routinely checked automatically after the vehicle engine has been started.

Having described the preferred embodiment of the invention, those skilled in the art can readily devise other embodiments and modifications, which embodiments and modifications are to be considered to be within the scope of the approved claims.

What is claimed is:

1. A device for controlling the pressure in an auxiliary pressure supply system of a vehicle hydraulic brake unit, including a pressure accumulator of the diaphragm or bladder type comprising, a hydraulic pump driven by a motor adapted to be switched on and off pressure-responsively for maintaining an operating hydraulic pressure of said accumulator, hydraulic and electric switching means operatively associated with said pump and said motor for reducing said hydraulic pressure in the pressure accumulator to a predetermined residual value substantially equal to the gas inflation pressure of said pressure accumulator after an engine for propelling the vehicle has been turned off, said switching means including an electromagnetically actuable multidirectional control valve closed in an inactivated state and open in an activated state and a pressure limting control valve, said valves being in a pressure fluid conduit interconnecting said pressure accumulator with a pressure supply reservoir.

2. A device as claimed in claim 1 wherein there is provided a pressure-responsive switch coupled to said control valve set to close at said predetermined residual pressure value to which the accumulator pressure is to be reduced, said switch including means providing for a time delay period before said multidirectional control valve opens after the vehicle engine is turned off.

3. A device as claimed in claim 2 wherein:
the pressure-limiting valve is in series with the control valve, the pressure accumulator and the pressure supply reservoir;
said pressure timing valve adapted to close the pressure-fluid conduit at the predetermined residual pressure value to which the accumulator pressure is to be reduced.

4. A device as claimed in claim 3 further comprising:
a time delay circuit coupled to the control valve, said time delay circuit activates the control valve a predetermined time after the engine is turned off, said predetermined time ranging from several minutes up to about one hour.

5. A device as claimed in claim 4, wherein the time delay circuit is variable by means of a manually actuatable switch for adjusting the predetermined time.

6. A device as claimed in claim 4 wherein the predetermined time after the engine is turned off is variable in dependence upon at least ambient temperature, and a specific mode of operation of the vehicle.

* * * * *